United States Patent
Kusaka

(10) Patent No.: US 7,098,624 B2
(45) Date of Patent: Aug. 29, 2006

(54) METHOD AND SYSTEM FOR DETECTING THE DISCONNECTION OF AN AUXILIARY POWER SUPPLY FROM A POLY-PHASE MOTOR

(75) Inventor: Yasushi Kusaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/519,791

(22) PCT Filed: Jul. 1, 2003

(86) PCT No.: PCT/JP03/08363

§ 371 (c)(1),
(2), (4) Date: Dec. 29, 2004

(87) PCT Pub. No.: WO2004/008602

PCT Pub. Date: Jan. 22, 2004

(65) Prior Publication Data

US 2005/0258796 A1    Nov. 24, 2005

(30) Foreign Application Priority Data

Jul. 12, 2002  (JP) ............................. 2002-204088
Jul. 12, 2002  (JP) ............................. 2002-204104
Jul. 31, 2002  (JP) ............................. 2002-222895

(51) Int. Cl.
*H02P 1/24* (2006.01)

(52) U.S. Cl. .................... 318/727; 318/782; 318/798; 318/802; 318/805; 318/812

(58) Field of Classification Search ............... 322/28; 318/801, 727, 442, 34, 771, 782, 798, 802, 318/805, 812
See application file for complete search history.

(56) References Cited

U.S. PATENT DOCUMENTS

| | | | |
|---|---|---|---|
| 6,476,571 B1 | 11/2002 | Sasaki | |
| 2002/0105300 A1* | 8/2002 | Moriya et al. | 318/727 |
| 2003/0146726 A1* | 8/2003 | Ishikawa et al. | 318/442 |

FOREIGN PATENT DOCUMENTS

| | | |
|---|---|---|
| EP | 1 034 968 | 9/2000 |
| JP | 11-178114 | 7/1999 |
| JP | 2000-324857 | 11/2000 |
| JP | 2002-027779 | 1/2002 |
| JP | 2002-315313 | 10/2002 |

* cited by examiner

*Primary Examiner*—Karen Masih
(74) *Attorney, Agent, or Firm*—Kenyon & Kenyon LLP

(57) ABSTRACT

To a neutral point of a motor is connected a positive electrode of an auxiliary battery and an auxiliary load. Voltage on a power supply line to the auxiliary load, a neutral point voltage, is detected, and disconnection of the auxiliary battery is determined when an increase of ripples in the neutral point voltage is detected. When a voltmeter cannot be used, control of the neutral point voltage is continued by measuring current of the auxiliary battery and performing control such that the current value becomes 0. A resolver is further provided on the motor for detecting the rotor angle with high accuracy. A control circuit generates, in accordance with an output of the resolver, a voltage control signal for each phase current having the same amplitude as the carrier amplitude during startup, and compares the voltage control signal to carrier to obtain a gate signal having the same frequency as the carrier frequency. In switching of the inverter, due to this gate signal, periods in which all phases are on or off are reduced, thereby preventing a large neutral point current.

24 Claims, 19 Drawing Sheets

METHOD AND SYSTEM FOR DETECTING THE DISCONNECTION OF AN AUXILIARY POWER SUPPLY FROM A POLY-PHASE MOTOR

This is a 371 national phase application of PCT/JP2003/008363 filled 1 Jul. 2003, claiming priority to Japanese Application Nos. 2002-204088 and 2002-204104, both filed 12 Jul. 2002, and No. 2002-222895 filed 31 Jul. 2002, the contents of which are incorporated herein by reference in their entireties.

TECHNICAL FIELD

The present invention relates to an inverter system for driving a poly-phase motor comprising an alternating current motor which is driven by an inverter and generates electrical power and a power supply which is connected to a neutral point of the alternating current motor.

BACKGROUND ART

Conventionally, alternating current motors have been commonly used as a power source for various devices. In electric vehicles and hybrid vehicles, a system is typically adopted in which direct current supplied from a battery is converted into a desired alternating current by an inverter, and is then supplied to a motor. This system allows a wide range of output torques and also achieves an advantage that electrical power generated by regenerative braking can be utilized for battery charging.

Because a high voltage power supply is effective for a high power motor, electric vehicles and hybrid vehicles usually adopt a high voltage power supply on the order of several hundred volts for the main battery connected on the input side of the inverter. On the other hand, a voltage which is a half the input voltage of the inverter is typically obtained at a neutral point of a star connection motor coil. Therefore, when a battery is connected to the neutral point, two types of direct current voltages can be obtained from the system. Further, by applying chopper control to the motor coil, transfer of electrical power between two batteries can be controlled.

Accordingly, when a motor also acts as a generator in hybrid vehicles or the like, a system can be adopted in which generated electrical power is utilized for charging two batteries, thereby obtaining two power supply voltages. In particular, a capacitor can be used in place of a battery. Such a system is described, for example, in Japanese Patent Laid-Open Publication No. Hei 11-178114.

A variety of electrical equipment is installed on most vehicles, and an auxiliary battery of approximately 12V (14V when charged) is typically provided to power this equipment. Because the above-described neutral point voltage of the motor is about one half the voltage on the input side of the inverter, the neutral point voltage is significantly high in typical electric vehicles and hybrid vehicles, which makes it difficult to connect an auxiliary battery to the neutral point in these vehicles. Accordingly, a separate DCDC converter is provided for charging the auxiliary battery.

On the other hand, a so-called "dual power supply system" in which a 36-volt power supply and a 12-volt power supply are provided has been studied as a practical application example of the above system. In this dual power supply system, because it is sufficient to set the inverter input voltage to approximately 42V when charging the 36-volt power supply and set the neutral point voltage to approximately 14V when charging the 12-volt power supply, transfer of electrical power between the two power supplies can be performed using a motor coil.

Accordingly, in the above poly-phase motor driving inverter system, electrical charges can be transferred between a high voltage side battery and a low voltage side battery using a motor coil. This is advantageous in that the need for providing a DCDC converter can be eliminated.

In the inverter system for driving a poly-phase motor as described above, a large number of auxiliary equipments, commonly in the form of vehicle accessories or auxiliary devices, are connected to the low voltage side battery, and the low voltage side battery therefore serves to supply constant electrical power to these devices. Namely, in the poly-phase motor driving inverter system, switching of the switching elements in the inverter is controlled to thereby control the neutral point voltage.

However, because the neutral point voltage cannot be continuously maintained at a constant value, when the low voltage battery is not available, the voltage to be supplied to the auxiliary equipment changes significantly and constant operation of the equipment is prohibited. Accordingly, when the low voltage side battery becomes disconnected (namely, electrical connection is interrupted) in certain circumstances, the system suffers from the problem described above.

Further, in order to maintain the charging state of the low voltage side battery at a predetermined level, it is necessary to supply power in accordance with electrical power which is consumed by the auxiliary loads connected to the low voltage side battery to a power supply line to which the low voltage side battery is connected. Accordingly, conventionally, the voltage on the low voltage power supply line is sensed, and the electrical power generated by the motor is subjected to feedback control so as to maintain the sensed voltage constant.

However, the above conventional system suffers from a problem that generated power cannot be controlled in the event of that sensing of the voltage on the low voltage power supply line cannot be performed normally due to disconnection or the like, thereby causing overvoltage or low voltage.

Further, in the conventional system, a hall sensor is typically used as a position sensor and detects the position of a rotor only at 60 degree intervals. In order to obtain sufficient starting torque at the time of motor starting, 180 degree current flow type (current flows during 180 degree electrical angle and then polarity of the current is changed) is typically performed during startup of the motor. More specifically, as shown in FIG. 19, three phase rectangular wave voltage commands (indicated by a solid line, a dotted line, and a chain and dot line in the uppermost view in FIG. 19) are used to generate rectangular wave switching control signals for the inverter (gate signals Su, Sv, Sw). Accordingly, the motor driving current is rectangular wave. When a motor is a three-phase motor, 180 degree conduction gate signals Su, Sv, and Sw with 120 degree phase shift are generated for driving the motor. Here, a period in which two phases are both ON or OFF occurs for a period which is ⅙ of the current cycle. Further, for each phase current, by applying maximum current regulation which turns the corresponding phase off when the current value reaches a predetermined value, a period in which three phases are all ON or OFF occurs.

When the inverter retains the same switching state for a relatively long period and a difference between the neutral point potential and the low voltage target value is increased, the system suffers from a problem that the neutral point current changes significantly and the low voltage power supply line also changes significantly.

Japanese Patent Laid-Open Publication No. 2000-324857 describes provision of a relay between a low voltage power supply and a neutral point so that the low voltage power supply line is separated from the neutral point by the relay during startup of the motor. With this configuration, although voltage change on the low voltage power supply line during startup can be reduced, it is necessary to additionally provide a relay and to switch the relay ON and OFF as required.

DISCLOSURE OF THE INVENTION

The present invention advantageously provides an inverter system for driving a poly-phase motor, which is capable of reliably detecting disconnection of a low voltage battery.

The present invention further advantageously enables appropriate power generation control, even in the event of an abnormality in the measurement or detection of a low voltage side power supply line.

The present invention further advantageously effectively reduces significant changes in the neutral point current during startup.

According to one aspect of the present invention, abnormality is determined based on a detection result obtained from neutral point state detecting means of an alternating current motor.

Neutral point voltage or neutral point current is smoothed due to the presence of a power supply. When the power supply is disconnected, however, the neutral point current or neutral point voltage is likely to vary because no effect can be obtained from the power supply. It is therefore possible to effectively detect abnormality of power supply disconnection based on the state of the neutral point.

Further, according to another aspect of the present invention, when the voltage of a power supply connected to the motor neutral point cannot be measured, the neutral point voltage of the inverter is controlled using power supply current. It is therefore possible to control the neutral point voltage of the inverter even when the voltage of the power supply connected to the motor neutral point cannot be measured.

Still further, according to another aspect of the present invention, ON/OFF of the switching elements of the inverter is controlled based on a gate signal obtained by comparison between a sinusoidal wave voltage command and carrier, so that the sinusoidal wave voltage command is limited to a predetermined range with respect to the carrier amplitude. Thus, a gate signal having the same frequency as the carrier frequency can be obtained. It is therefore possible to prevent a problem that switching pattern remains the same for a long period and significant current flows as neutral point current.

BRIEF DESCRIPTION OF THE DRAWINGS

These and other objects of the invention will be explained in the description below, in connection with the accompanying drawings, in which.

DETAILED EXPLANATION OF PREFERRED EMBODIMENTS

Preferred embodiments of the present invention will be described with reference to the drawings.

Embodiment 1

Figure 1:
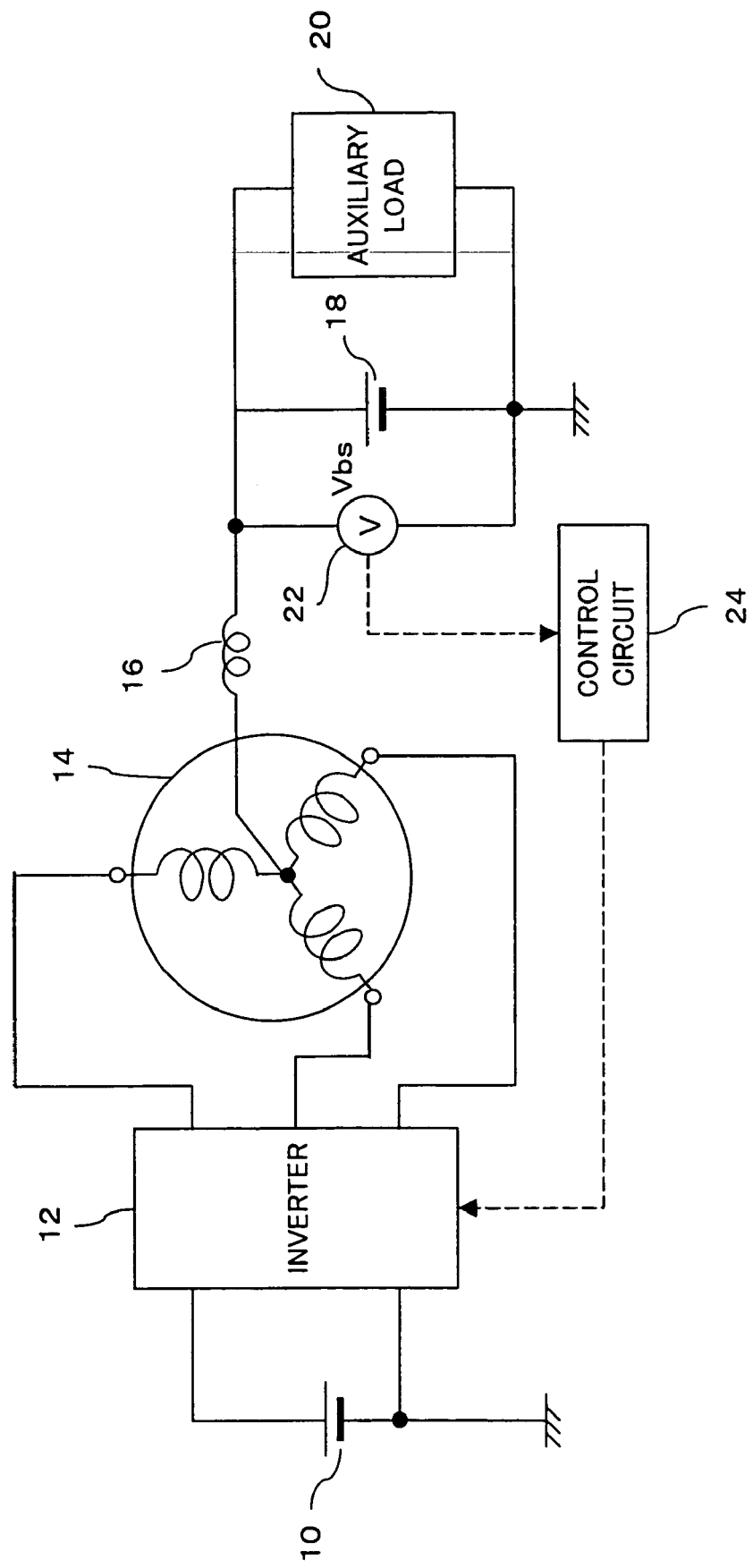
FIG. 1 is a view showing a configuration of a system according to a first embodiment of the present invention.

FIG. 1 shows the overall configuration of an inverter system for driving a poly-phase motor in accordance with an embodiment of the present invention. An inverter 12 is connected to a 36-volt (42V when charged) battery 10 which serves as a main power supply. Namely, a voltage of 36V output from the battery 10 is applied between a positive bus and a negative bus of the inverter 12.

The inverter 12 has three arms provided in parallel each including two switching elements (transistors) arranged between the positive bus and the negative bus. The inter-transistor points in the respective arms connect respectively to three phase motor output terminals.

Three phase motor coil terminals of a three-phase alternating current motor 14 are respectively connected to the three phase motor output terminals of the inverter 12. Accordingly, while one of the upper transistors of the inverter 12 is sequentially turned on, a transistor of other arms is sequentially turned on, so that a motor current with 120° phase difference is applied to each phase coil of the alternating current motor 14.

Further, to the neutral point of the alternating current motor 14, a positive electrode of an auxiliary battery 18 and various auxiliary loads 20 are connected via a reactor 16. A voltmeter 22 is connected between the auxiliary battery 18 and the reactor 16 for detecting voltage on a power supply line for the auxiliary battery 18. The output of the voltmeter 22 (battery voltage: Vbs) is supplied to a control circuit 24.

The control circuit 24 determines the size of a ripple component from the output from the voltmeter 22, and detects abnormality such as disconnection of the auxiliary battery 18 when the ripple size is a predetermined level or greater.

In such a system, it is possible to control the neutral point voltage by changing an on duty ratio between the upper transistor and the lower transistor of the inverter 12. More specifically, when the ON periods are identical for both transistors, the neutral point voltage is equivalent to inverter input voltage (voltage of the battery 10). On the other hand, when the ON period for the upper transistor is 2 with regard to the ON period 1 of the lower transistor, the neutral point voltage is one third of the voltage of the battery 10.

For example, when the voltage of the battery 10 is 36V (42V when charged), the voltage of the auxiliary battery 18 is 12V (14V when charged). Then, electrical power supplied from the battery 10 is used to drive the alternating current motor 14 for performing torque assist during startup of a vehicle, for example, whereas electrical power from the auxiliary battery 18 is used to operate the various auxiliary loads 20.

Here, because the neutral point voltage is controlled such that it is one third of the voltage of the battery 10, the ON periods of the upper and lower transistors in the inverter 12 are unbalanced, causing the neutral point voltage to oscillate in accordance with the phase of the current supply to each motor phase. The reactor 16 smoothes the oscillating neutral point voltage to a certain extent, and the output voltage of the reactor 16 is maintained at substantially constant level by the auxiliary battery 18.

However, when the auxiliary battery 18 is disconnected for some reason, the output of the reactor 16 is used to supply voltage to the auxiliary power supply line. While the voltage of the auxiliary power supply line remains substantially constant due to the capability of the auxiliary battery 18 when the auxiliary battery 18 is connected, once the auxiliary battery 18 becomes disconnected, the affects of voltage changes in the neural point directly appear in the auxiliary battery line.

Figure 2:
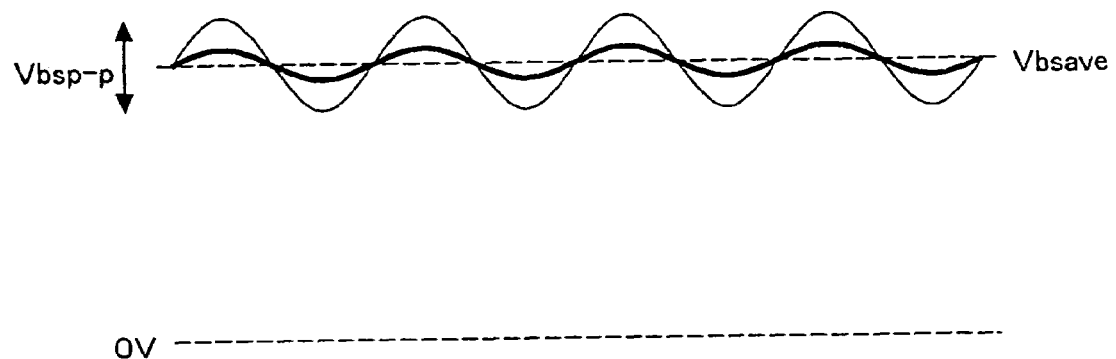
FIG. 2 is a view showing a waveform of a neutral point voltage.

Namely, similar to the neutral point voltage, the auxiliary power supply line also changes in accordance with the peak of each phase current of the motor. More specifically, the voltage of the auxiliary power supply line changes in a cycle which is three times that of each phase current of the motor, as shown in FIG. 2.

Figure 3:
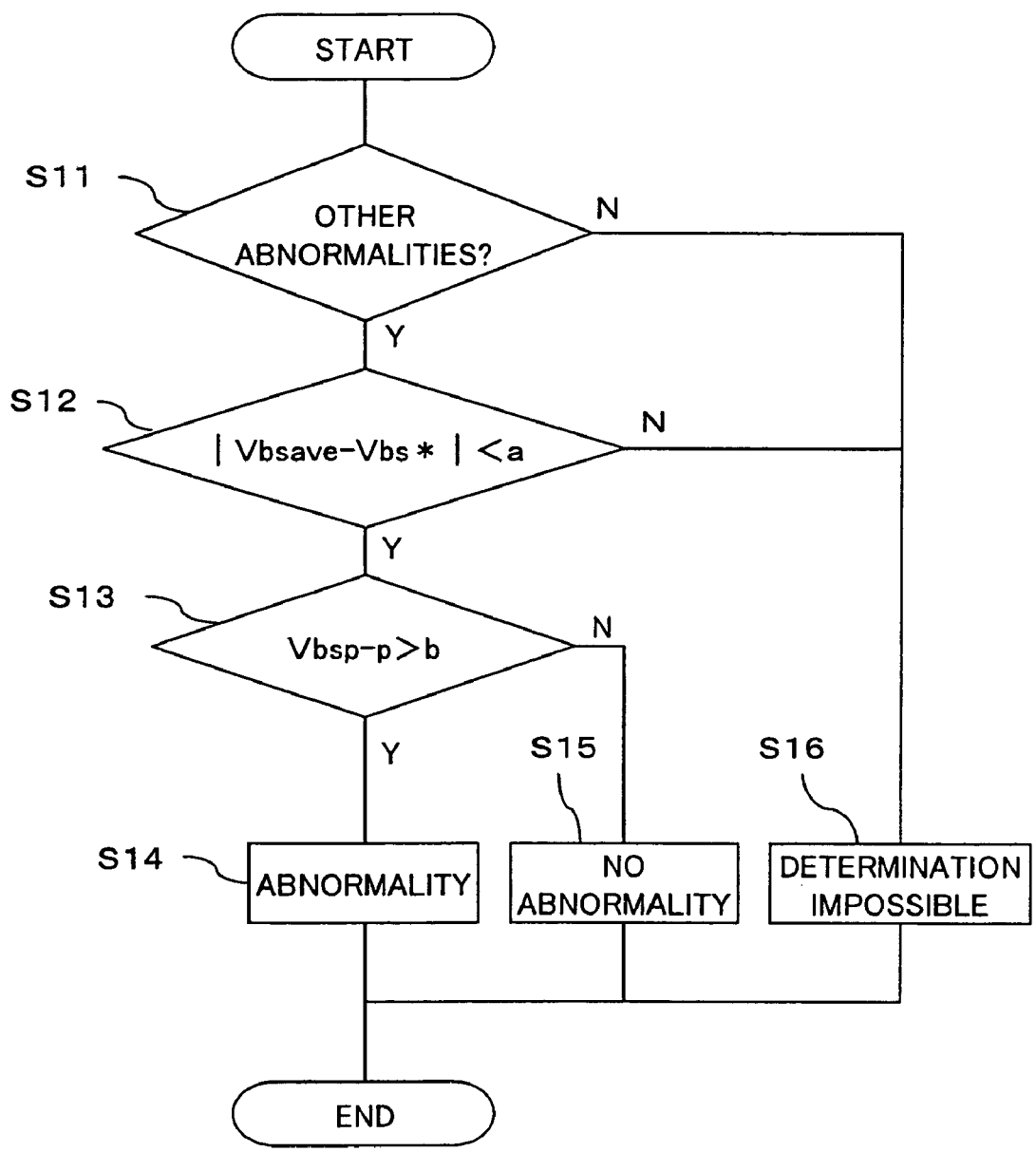
FIG. 3 is a flowchart for explaining the operation of abnormality detection.

According to the present embodiment, the control circuit 24 detects the size of the ripple component and determines abnormality when the detected value meets or exceeds a predetermined level. The determination operation performed by the control circuit 24 will be described with reference to FIG. 3.

It is first determined whether or not other abnormalities are found (S11). When no other abnormalities are found, it is then determined whether or not an absolute value of a value obtained by subtracting the target voltage (voltage command value) Vbs* of the 14V system from the average voltage value Vbsave of the 14V system is less than a predetermined threshold value a (S12). If YES, it is then determined whether or not the ripple of the 14V power supply, namely the peak to peak voltage Vbsp-p of the alternating current component shown in FIG. 2 is greater than a predetermined threshold value b (S13). When the determination at step S13 is YES, it is determined that the auxiliary battery is not operating normally (S14).

Here, the average voltage Vbsave of the 14V system auxiliary power supply line is approximately 13.5V to 14.5V, though it is variable depending on temperature. In accordance with the average voltage Vbsave, the target voltage Vbs* is determined to be 14V and the threshold value a is determined to be approximately 1V. Further, the threshold value b is set to approximately 0.5V, though it depends on reactance of the reactor 16.

When the determination at step S11 or S12 is NO, it is determined that determination is not possible (S16). When NO is determined at step S13, it is determined that the auxiliary battery is operating normally, that is, that there is no abnormality (S15).

Figure 4:
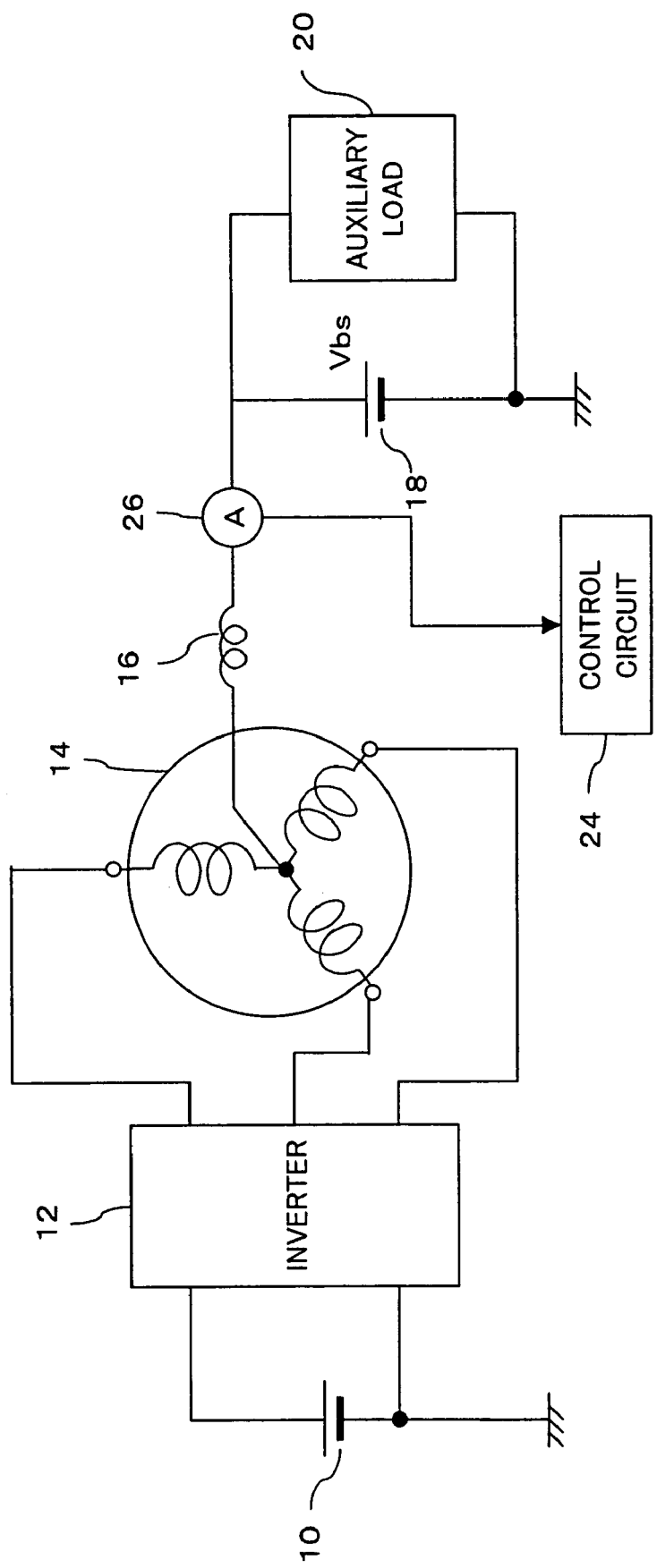
FIG. 4 is a view showing a configuration of another system according to the first embodiment of the present invention.

Referring to FIG. 4, a configuration in accordance with another example is shown, in which an ammeter 28 is provided in place of the voltmeter 22. More specifically, the ammeter 28 is provided before the connection point at which the reactor 16 and the positive electrode of the auxiliary battery 18 are connected, for detecting current flowing between the neutral point and the auxiliary battery 18 and between the neutral point and the auxiliary load 20. The control circuit 24 determines abnormality in accordance with the detection result of the ammeter 28.

Figure 5:
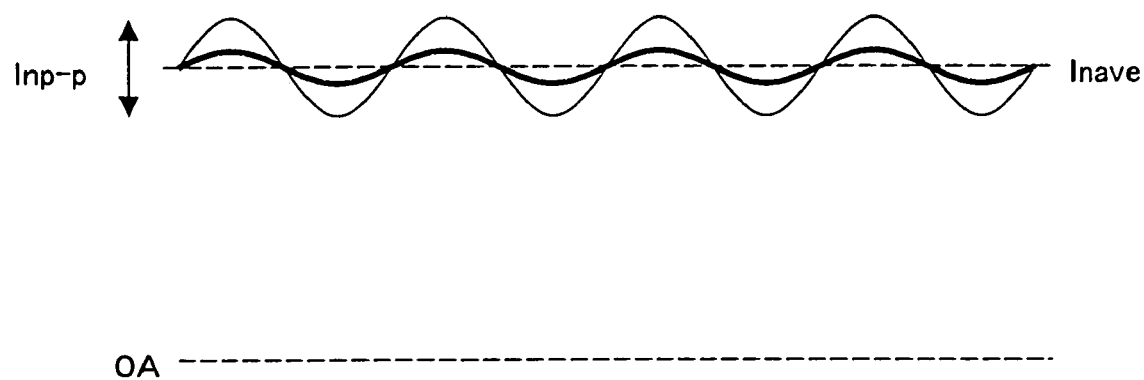
FIG. 5 is a view showing a waveform of a neutral point voltage.
Figure 6:
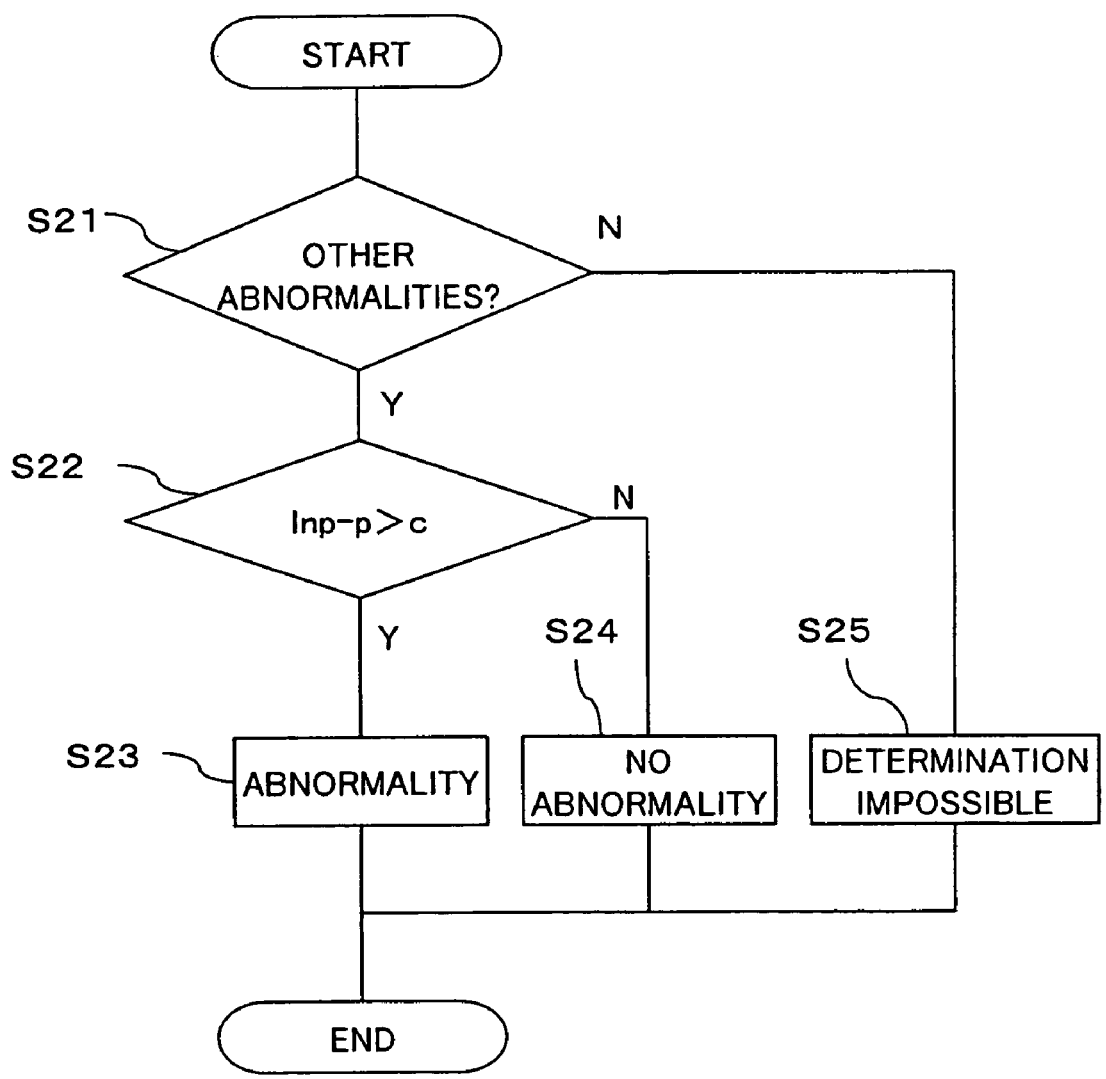
FIG. 6 is a flowchart for explaining the operation of abnormality detection.

Specifically, as shown in FIG. 6, is it first determined whether or not other abnormalities are found (S21). When no other abnormalities are found, it is then determined whether or not the ripple of the neutral point current which is detected by the ammeter 28, namely the peak to peak current value Inp-p of the alternating current component shown in FIG. 5, is larger than a predetermined threshold c (S22). If YES, it is then determined that the auxiliary battery is operating abnormally (S23).

On the other hand, when the determination at step S21 is NO, it is determined that determination is not possible (S25). When the determination at step S22 is NO, it is determined that no abnormality is found (S24).

As described above, according to the system of the present embodiment, it is possible to effectively detect an abnormality of the auxiliary battery.

Further, this control operation may be preferably combined with a control operation of adjusting each phase output voltage command described above in accordance with the carrier amplitude.

Here, it is preferable that the alternating current motor 14 is one used for a vehicle, and is mounted on a vehicle. The auxiliary load 20 may be any of various auxiliaries mounted on the vehicle. Further the alternating current motor 14 mounted on a vehicle may preferably be a motor generator for Eco Run System which is described in Japanese Patent Laid-Open Publication No. 2002-155773.

More specifically, this motor generator is used, for example, for (i) traveling of a vehicle with the engine automatically actuated in a case in which the vehicle is started after idling stop control is performed for shutting down the engine operation when the vehicle stops; (ii) regenerative power generation achieved by transmitting the revolution of a wheel via a drive system when the driving speed is reduced; (iii) driving of a compressor used for an air conditioner and a pump used for power steering at the time of engine stop due to stop of a vehicle; (iv) power generation when the engine is being driven; (v) control of the revolution of the engine which is not activated to reduce the vibration generated at the time of engine stop; and (vi) prevention of engine stalling as a result of reduced fuel supply to the engine during deceleration, until the engine is recovered and normal fuel supply resumed.

As described above, according to the present embodiment, abnormality is determined based on the state of current or voltage at the neutral point. Although the neutral point voltage or the neutral point current is smoothed by the presence of the power supply, it is likely to change when the power supply is disconnected and therefore does not influence the neutral point voltage and current. It is therefore possible to effectively detect abnormality that power supply is disconnected according to the state of the neutral point.

Further, the neutral point voltage and the neutral point current contains ripples based on the motor driving current. By detecting the size of these ripples, it is possible to effectively detect disconnection of the power supply.

Embodiment 2

Figure 7:
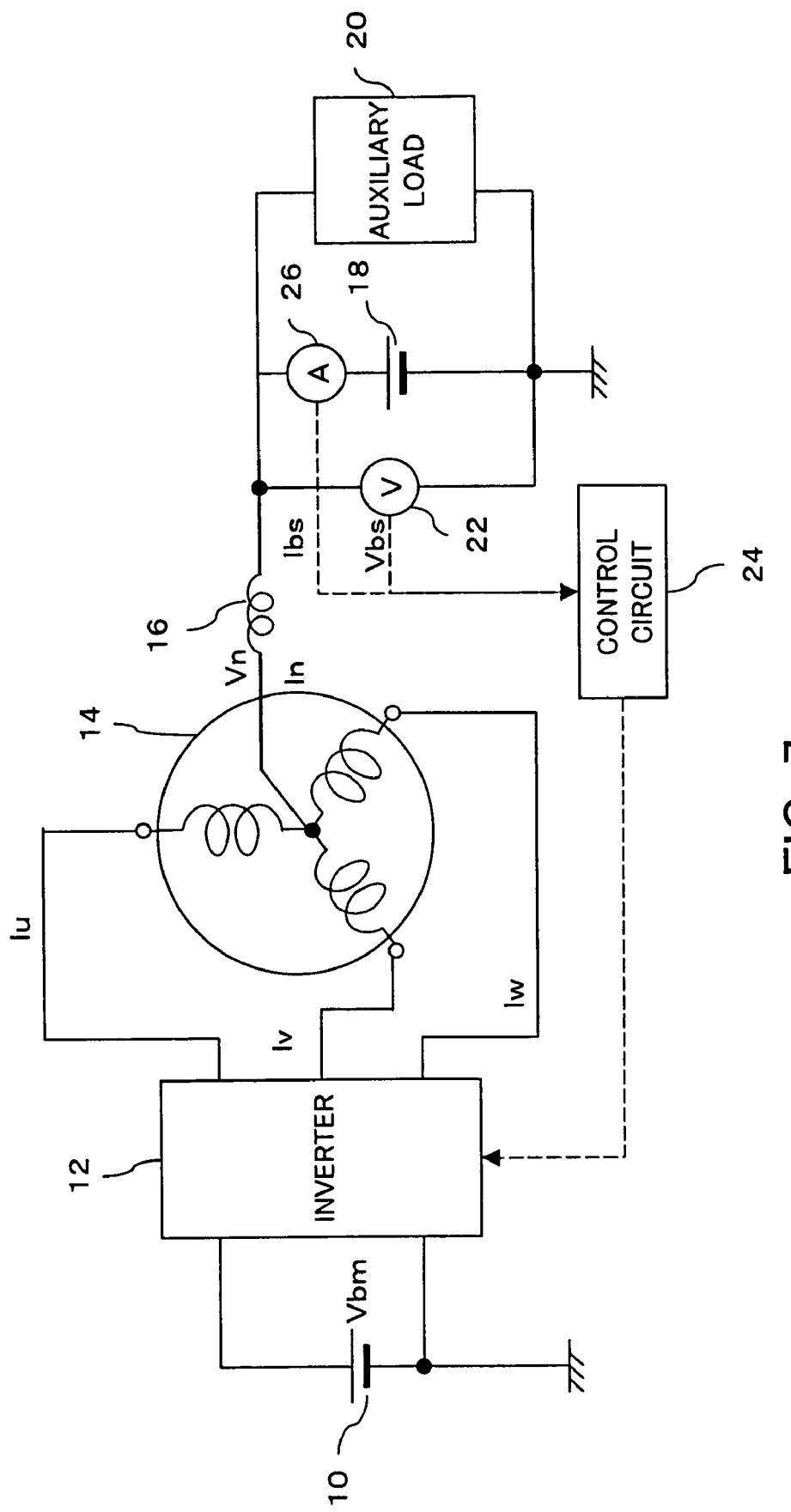
FIG. 7 is a view showing a configuration of a system according to a second embodiment of the present invention.

FIG. 7 shows a configuration of the system according to a second embodiment of the present invention. In this embodiment, in addition to the voltmeter 22, an ammeter 26 is provided between the auxiliary battery 18 and the power supply line for detecting current of the auxiliary battery 18 (battery current: Ibs). The output from the ammeter 26 is also supplied to the control circuit 24.

Figure 8:
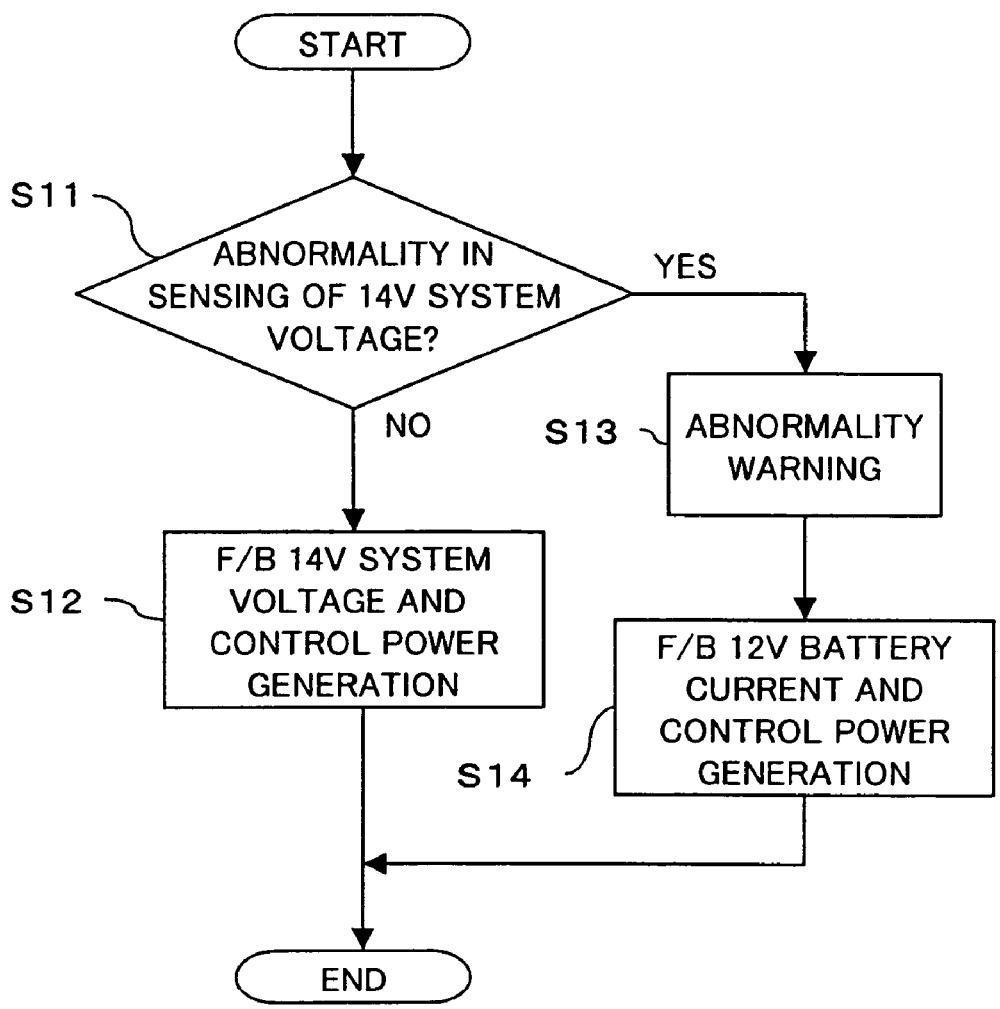
FIG. 8 is a flowchart for explaining the operation of the second embodiment.

The control circuit 24 measures values related to abnormality, as shown in FIG. 8. Specifically, it is first determined whether or not there is an abnormality in voltage sensing of the power supply line (14V system power supply line) to which the auxiliary battery 18 is connected (S11). This is determined by determining whether or not the output Vbs of the voltmeter 22 has a normal value. For example, when the output voltage Vbs is 8V or less, the various auxiliary loads cannot be driven normally, and abnormality is determined. In particular, when the voltage Vbs is 0V, it is determined a certain failure has occurred.

When the determination at step S11 is NO, it is determined there is no problem and switching of the inverter 12 is controlled based on the detected Vbs (14V system voltage).

When it is determined at step S11 that an abnormality exists, a warning indicative of the abnormality is issued (S13). For example, the display panel may indicate the sign "14V system battery sensing abnormal" or a lamp used for indicating abnormality of the auxiliary battery may be turned on.

Then, a value Ibs of the ammeter 26 is detected. Because the value Ibs represents a difference between current flowing through the auxiliary loads and the neutral point current, when the inverter 12 is controlled so as to make the value Ibs 0, it is possible to match the power used by the auxiliary load with the power generated by the motor 14. Therefore, according to the present embodiment, the inverter 12 is controlled such that the current Ibs becomes 0.

When 14V system voltage sensing is abnormal, feedback control cannot be performed and the generated voltage significantly deviates from the target, making occurrence of overvoltage and voltage reduction very likely. In such a case, the auxiliary battery 18 become incapable of running due to overcharge or rapid discharge, and the auxiliary loads suffer from failure caused by overvoltage and operation defect due to voltage reduction, and need for resetting a CPU also occurs. According to this embodiment, these problems can be prevented by substantially maintaining power generated by the motor 14 to the correct level using feedback control based on the sensing of the current Ibs. Further, by issuance of abnormality warnings, it is possible to appropriately resume the voltage sensing such that a normal state can be recovered before a serious problem occurs.

Figure 9:
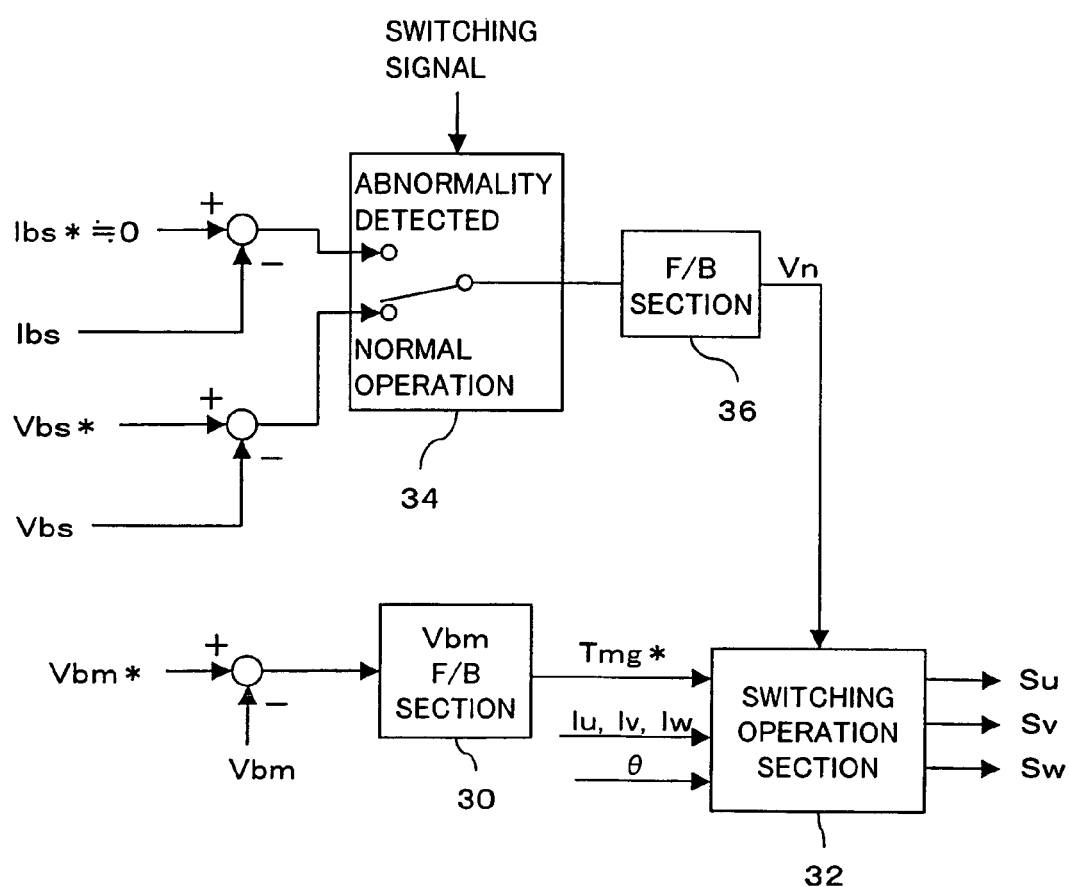
FIG. 9 is a view showing a configuration of a control circuit of the embodiment shown in FIG. 7.

FIG. 9 shows a configuration of the control circuit 24. The voltage Vbm of the high voltage battery 10 is measured and a difference between the voltage Vbm and the target voltage Vbm* is supplied to a Vbm feedback (F/B) section 30. The Vbm feedback (F/B) section 30 determines a torque command Tmg* of the motor 14 in such a manner that the voltage Vbm of the battery 10 corresponds to the target voltage Vbm*, and supplies the determined torque command Tmg* to a switching operation section 32. Here, the torque command Tmg* corresponds to power generation command of the motor 14.

Each phase coil current Iu, Iv, Iw of the motor 14 and a detection signal θ regarding the rotor position are also supplied to the switching operation section 32. The switching operation section 32 generates signals Su, Sv, Sw for controlling switching of the switching elements of each phase of the inverter in accordance with these inputs to thereby control each phase current of the motor 14. Thus, the output torque (generated power) of the motor 14 is controlled so as to correspond to the torque command Tmg*.

Further, a command value Vn of the neutral point voltage of the motor 14 is supplied to the switching operation section 32. Thus, a ratio of ON periods between the upper and lower switching elements of the inverter is controlled to control the neutral point voltage.

During normal operation, this neutral point voltage Vn is determined such that a difference between the voltage Vbs of the auxiliary battery 18 and the command value Vbs* thereof is supplied via a switching section 34 to the feedback (F/B) section 36 to make Vbs correspond to Vbs*. When an existence of an abnormality is determined at the above-described step S11 of FIG. 8, however, a switching signal is output at step S14, so that the switching section 34 supplies a difference between the auxiliary battery current Ibs and the command value thereof Ibs* to the feedback (F/B) section 36. Consequently, Vn is generated in the feedback (F/B) section 36 based on the auxiliary battery current Ibs. Because the switching operation section 32 controls switching of the inverter 12 based on this Vn, the neutral point of the motor 14 is controlled to a voltage in accordance with the power consumption by the auxiliary loads.

The control of the neutral point voltage Vn and the voltage Vbm of the battery 10 will be briefly described.

In this system, it is possible to control the neutral point voltage by changing an on duty ratio between the upper transistor and the lower transistor of the inverter 12. More specifically, when the ON periods are identical for both transistors, the neutral point voltage is equivalent to inverter input voltage (voltage of the battery 10). On the other hand, when the ON period for the upper transistor is 2 with regard to the ON period 1 of the lower transistor, the neutral point voltage is one third of the voltage of the battery 10.

For example, when the voltage of the battery 10 is 36V (42V when charged), the voltage of the auxiliary battery 18 is 12V (14V when charged). Then, electrical power supplied from the battery 10 is used to drive the alternating current motor 14 for performing torque assist during startup of a vehicle, for example, whereas electrical power from the auxiliary battery 18 is used to operate the various auxiliary loads 20.

Here, because the neutral point voltage is controlled such that it is one third of the voltage of the battery 10, the ON periods of the upper and lower transistors in the inverter 12 are unbalanced, causing the neutral point voltage to oscillate in accordance with the phase of the current supply to each motor phase. The reactor 16 smoothes the oscillating neutral point voltage to a certain extent, and the output voltage of the reactor 16 is maintained at substantially constant level by the auxiliary battery 18.

Figure 10:
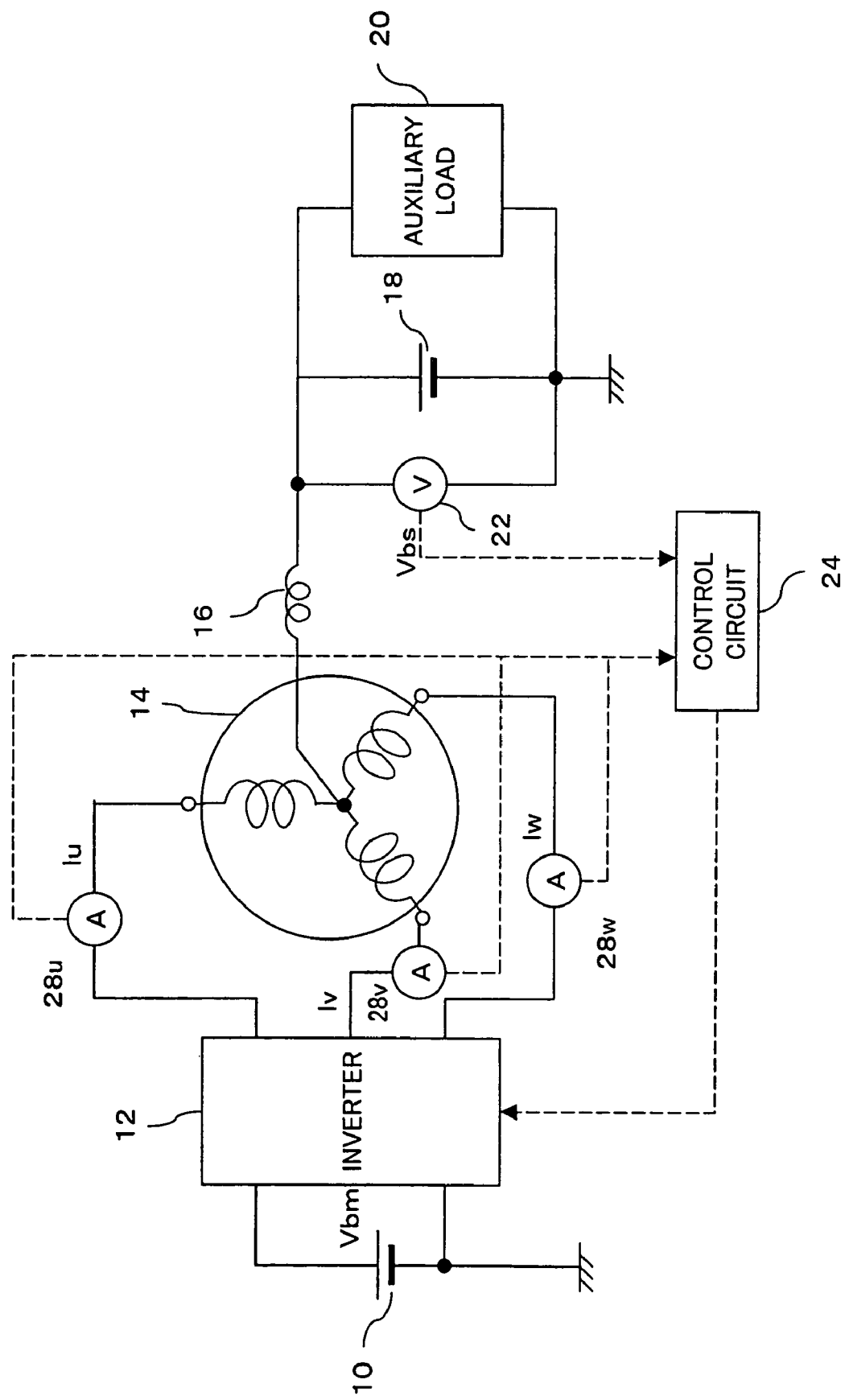
FIG. 10 is a view showing a configuration of another system according to the second embodiment of the present invention.

FIG. 10 shows a configuration of a system in accordance with another example of the present invention, in which ammeters 28u, 28v, 28w are adopted for each measuring current of each phase coil of the motor in place of the ammeter 26. Here, because currents Iu, Iv, Iw of each phase coil of the motor 14 are necessary for calculating the torque command Tmg* as described in FIG. 9, the ammeters 28u, 28v, 28w are originally provided. In this example, each phase coil current is utilized for control.

Here, in the absence of the neutral point current, the sum of each phase coil current should be 0. The sum of the currents Iu, Iv, Iw of the respective phases therefore corresponds to the neutral point current In. When the neutral point current In is controlled such that it corresponds to the current consumed by the whole auxiliary loads connected to the 14V power supply line, appropriate power is supplied to the 14V power supply. It is therefore possible to measure the current consumed by the auxiliary loads, determine the target value In* of the neutral point current based on the consumed current, and then control the neutral point current In so as to correspond to the target value In*.

However, it is generally impossible to measure the consumed current in all the auxiliary loads. Therefore, according to this example, the minimum consumed current of the whole auxiliary loads is previously obtained, and the target neutral point current In* is set to the minimum consumed current.

In this manner, overcharging of the auxiliary battery 18 can be prevented. Although the auxiliary battery 18 discharges when the power consumption of the auxiliary loads increases, rapid discharge of the auxiliary battery 18 can still be prevented.

Figure 11:
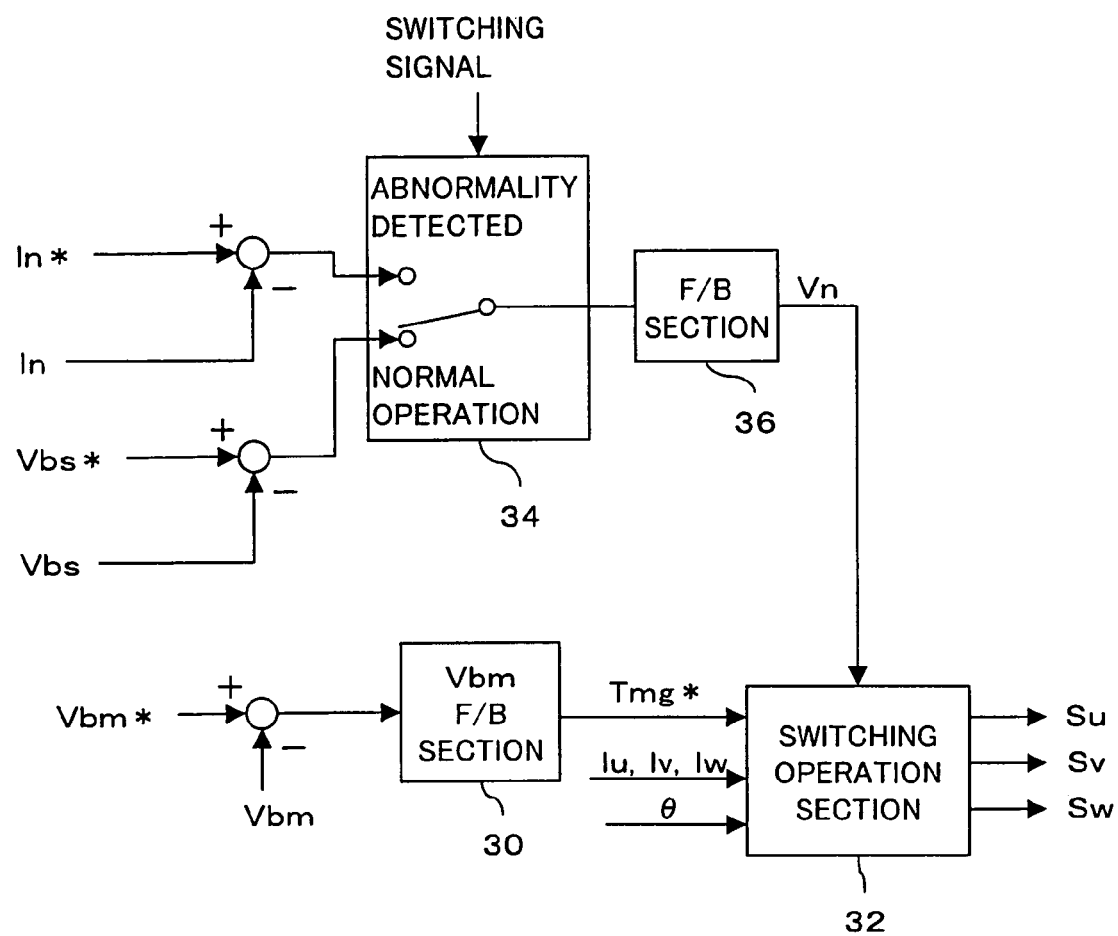
FIG. 11 is a view showing a configuration of a control circuit of the system shown in FIG. 10.

FIG. 11 shows a configuration of the control circuit 24 according to the present embodiment. As described above, at the time of abnormality, a difference between the neutral point current and the target value thereof (In*−In) is selected in the switching section 34 and is supplied to the feedback (F/B) section 36. The feedback (F/B) section 36 then generates a neutral point voltage target value Vn based on the difference and supplies the target value Vn to the operation section 32.

As a more simple method, it is also possible to eliminate even the feedback of battery current or neutral point current and to calculate the neutral point voltage command Vn using open loop feed-forward control. For example, the neutral point voltage command Vn is set to 14V. With this system, although accuracy of voltage generation control is lowered, it is still possible to perform improved control compared to when no control is performed.

Figure 12:
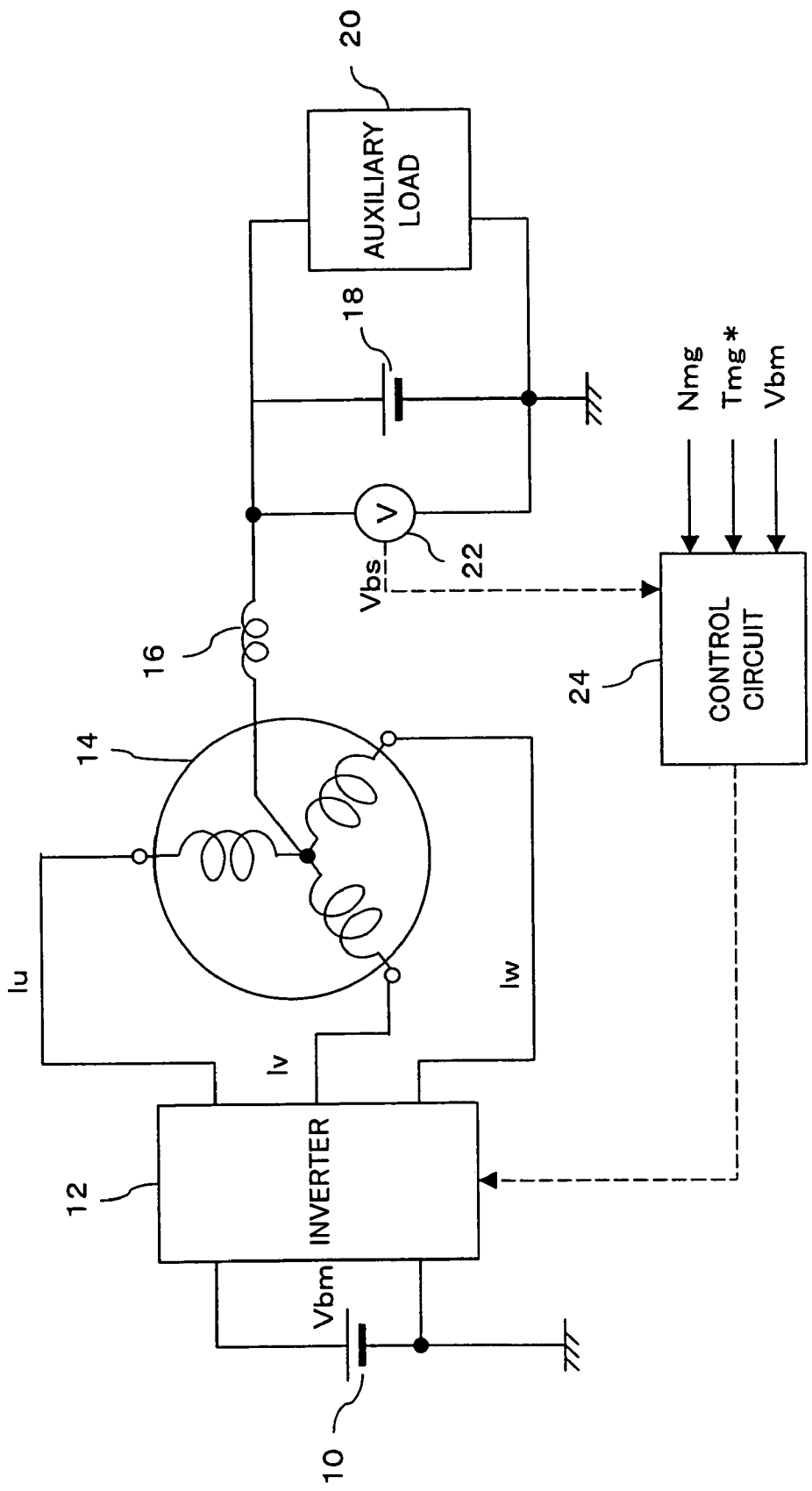
FIG. 12 is a view showing a configuration of another system according to the second embodiment of the present invention.

FIG. 12 shows a system configuration example in which control accuracy is enhanced in open loop control. In this example, during normal operation, a difference between the auxiliary load power supply line voltage command Vbs* and the the auxiliary load power supply line voltage Vbs is input to the control circuit 24 so as to correct the control of the inverter 12.

Figure 13:
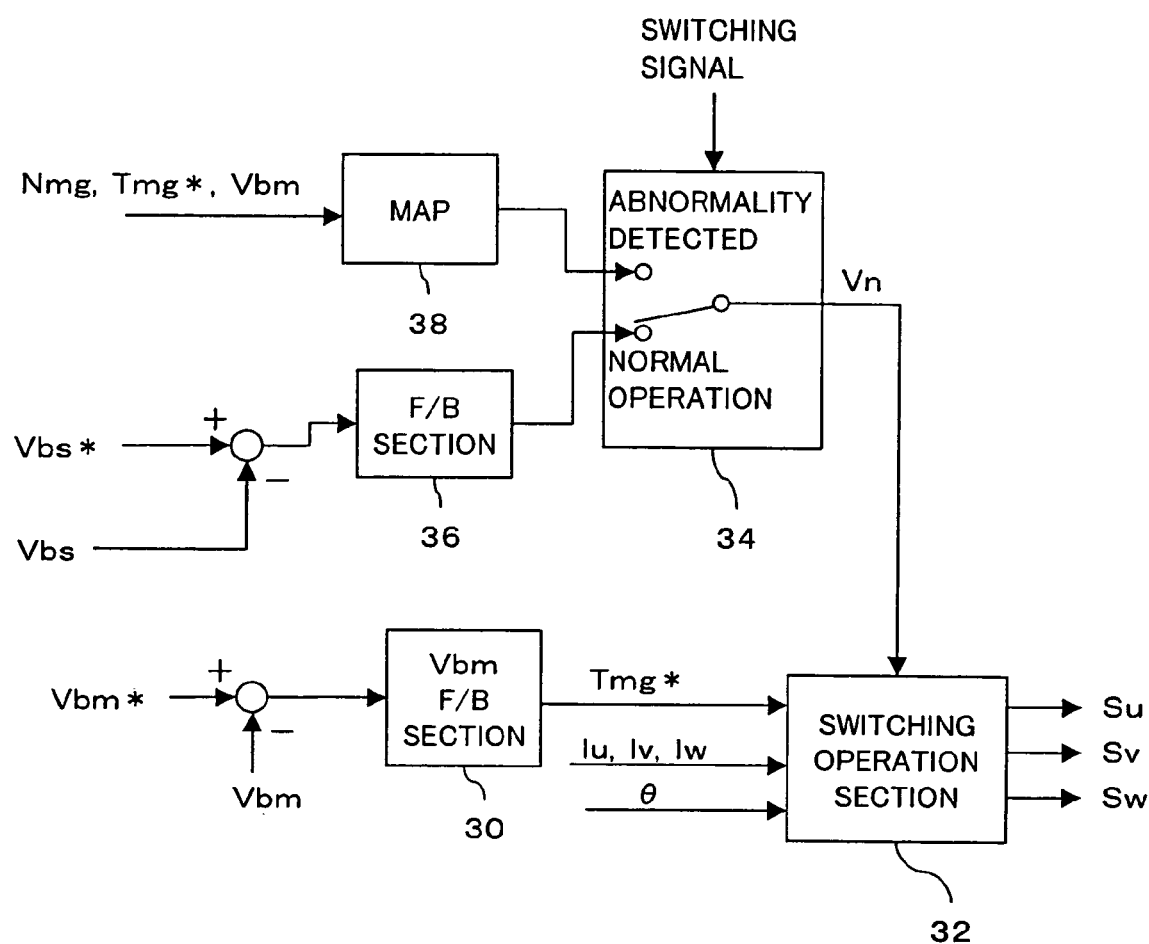
FIG. 13 is a view showing a configuration of a control circuit of the system shown in FIG. 12.

FIG. 13 shows a configuration of the control circuit 24 according to this embodiment.

Specifically, a difference between the auxiliary load power supply line voltage command Vbs* and the voltage Vbs is input to the feedback (F/B) section 36, where a neutral point voltage command Vn is generated and is supplied via the switching section 34 to the switching operation section 32. In the event of an abnormality, on the other hand, values for the revolution of he motor Nmg, the motor output torque command Tmg*, and the voltage Vbm of the battery 10 are input to the map 38 which outputs a corrected neutral point voltage command Vn. The corrected output Vn is then supplied via the switching section 34 to the switching operation section 32.

It is thus possible to correct Vn based on the operation state or the like when abnormalities occur, so that driving of inverter can be controlled in a manner which suits the present situation.

Here, it is preferable that the alternating current motor 14 is one used for a vehicle, and is mounted on a vehicle. The auxiliary load 20 may be any of various auxiliaries mounted on the vehicle. Further the alternating current motor 14 mounted on a vehicle may preferably be a motor generator for Eco Run System which is described in Japanese Patent Laid-Open Publication No. 2002-155773.

More specifically, this motor generator is used, for example, for (i) traveling of a vehicle with the engine automatically actuated in a case in which the vehicle is started after idling stop control is performed for shutting down the engine operation when the vehicle stops; (ii) regenerative power generation achieved by transmitting the revolution of a wheel via a drive system when the driving speed is reduced; (iii) driving of a compressor used for an air conditioner and a pump used for power steering at the time of engine stop due to stop of a vehicle; (iv) power generation when the engine is being driven; (v) control of the revolution of the engine which is not activated to reduce the vibration generated at the time of engine stop; and (vi) prevention of engine stalling as a result of reduced fuel supply to the engine during deceleration, until the engine is recovered and normal fuel supply resumed.

As described above, according to the present embodiment, when the voltage of the power supply connected to the motor neutral point cannot be measured, the feedback control can be continuously performed using power supply current.

Further, by controlling the neutral point current so as to correspond to the consumed current of the auxiliary loads, appropriate inverter control can be achieved.

Also, by setting the neutral point voltage to a voltage which is appropriate as a power supply voltage of the auxiliary loads, control can be continued in a simple manner.

Embodiment 3

Figure 14:
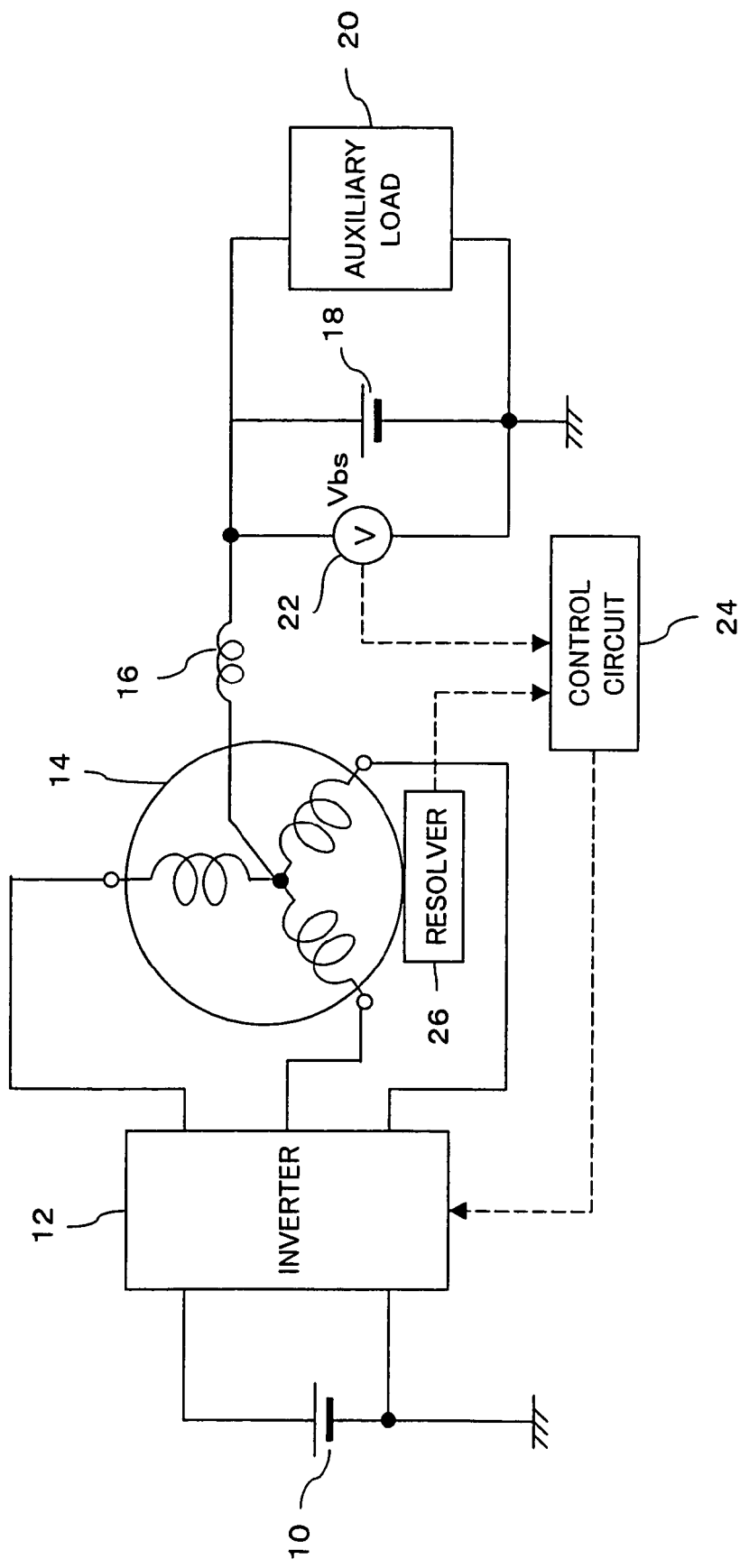
FIG. 14 is a view showing a configuration of a system according to a third embodiment of the present invention.

Referring to FIG. 14, a system configuration in accordance with a third embodiment is shown. In this embodiment, a resolver 28 is provided for detecting a rotation angle of the motor and the output from the resolver 28 is supplied to the control circuit 24.

As described above, during normal operation, the control circuit 24 controls switching of the inverter 12 based on the output Vbs of the voltmeter 22 to control the current to be supplied to the motor 14, thereby controlling power generation of the motor 14 such that the voltage Vbs becomes a desired value (14V, for example).

Specifically, it is possible to control the neutral point voltage by changing an on duty ratio between the upper transistor and the lower transistor of the inverter 12. More specifically, when the ON periods are identical for both transistors, the neutral point voltage is equivalent to inverter input voltage (voltage of the battery 10). On the other hand, when the ON period for the upper transistor is 2 with regard to the ON period 1 of the lower transistor, the neutral point voltage is one third of the voltage of the battery 10.

For example, when the voltage of the battery 10 is 36V (42V when charged), the voltage of the auxiliary battery 18 is 12V (14V when charged). Then, electrical power supplied from the battery 10 is used to drive the alternating current motor 14 for performing torque assist during start up of a vehicle, for example, whereas electrical power from the auxiliary battery 18 is used to operate the various auxiliary loads 20. According to the present embodiment, the resolver 28 is provided to detect the rotation angle of the motor 14. The resolver 28 is a highly accurate angular sensor which has a configuration similar to that of an alternating current motor and generates two sinusoidal waves with 90 degree phase difference at the secondary coils in accordance with the rotation angle of the primary coil. The output from the resolver 28 is supplied to the control circuit 24 and is used for control of each phase current of the motor 14. In particular, during startup, each phase voltage command value which is a sinusoidal wave is generated in accordance with the output of the resolver 28. Each phase voltage command value is set within a predetermined range which does not exceed or does not significantly exceed the carrier amplitude.

Figure 15:
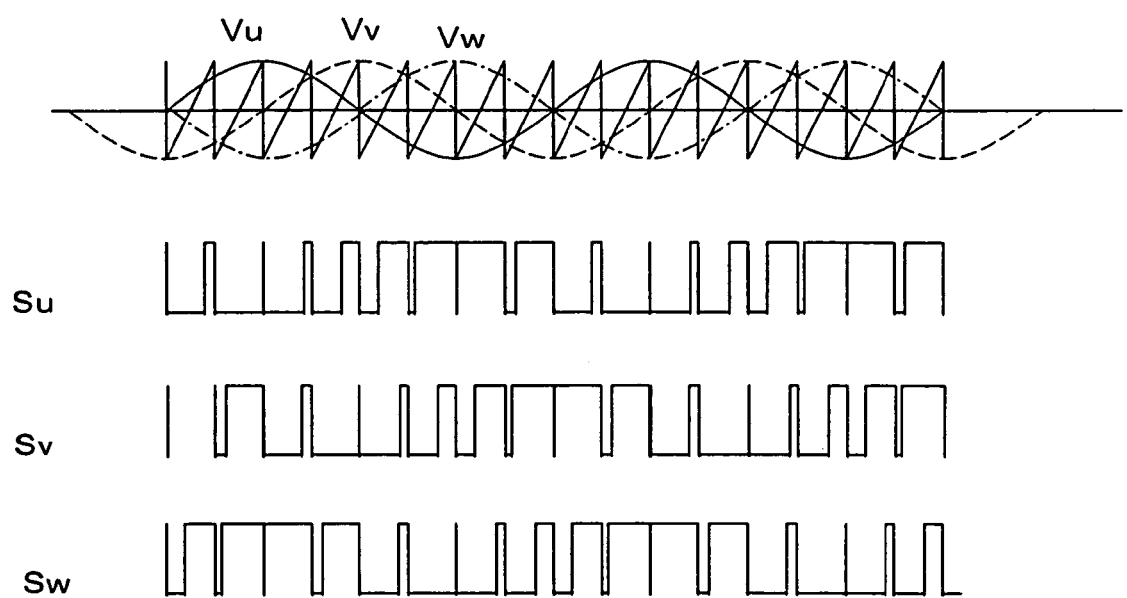
FIG. 15 is a view showing an operation of carrier comparison according to the embodiment shown in FIG. 14.

For example, as shown in FIG. 15, each phase voltage command value is set slightly smaller than the carrier amplitude. As a result, a gate signal having the same frequency as the carrier frequency can be obtained. It is therefore possible to prevent the problem that the switching does not occur for a long period and significant current flows as neutral point current.

Because the neutral point potential is an average value of the phase voltage command values, it is possible to control the neutral point voltage to a target value by setting the average value to the target neutral point voltage. Although in the example shown in FIG. 15 the neutral point voltage is one half the inverter input voltage for convenience, the control operation is basically the same when the neutral point voltage is one third of the inverter input voltage. Specifically, appropriate control can be achieved by adjusting the amplitude of each phase voltage command so that a gate signal which turns on and off at the carrier frequency can be generated.

Figure 16:
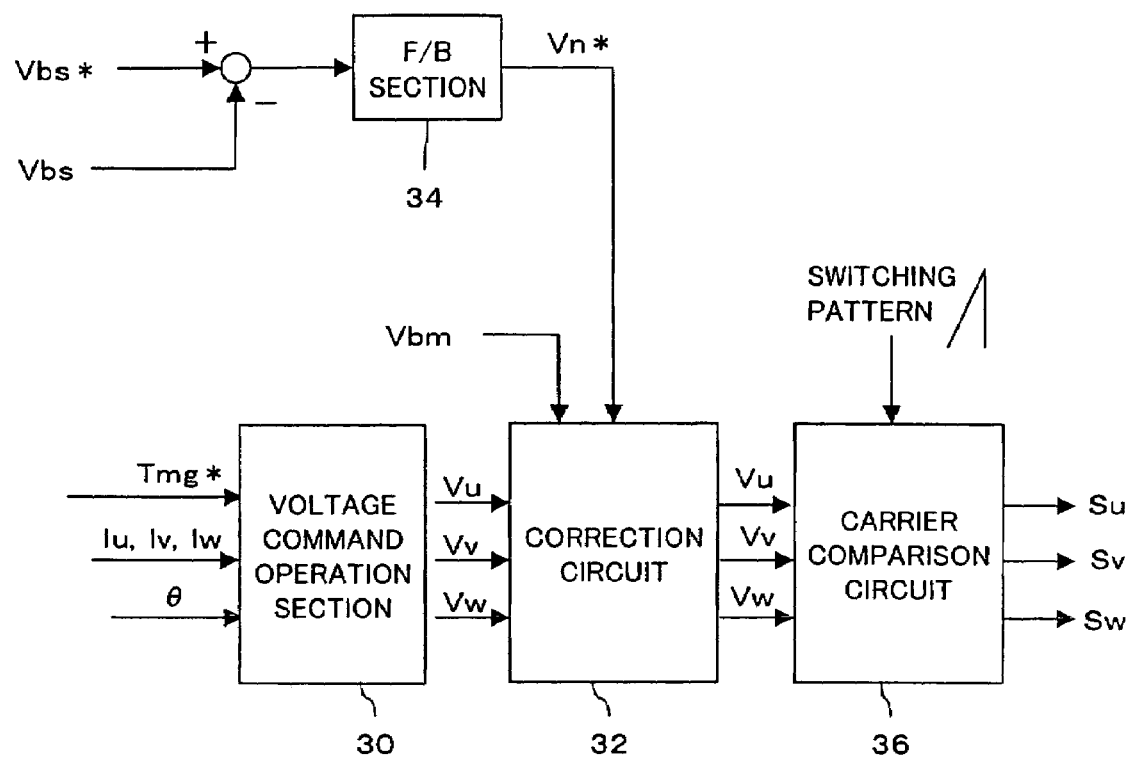
FIG. 16 is a view showing a configuration of a control circuit of the embodiment shown in FIG. 14.

FIG. 16 shows a circuit provided within the control circuit 24 for generating a gate signal. A torque command Tmg*, each phase current Iu, Iv, Iw, and a resolver position signal θ are supplied to a voltage command operation section 30. The voltage command operation section 30 calculates each phase voltage command Vu, Vv, Vw, as shown in FIG. 15, with mutual phase shift of 120 degree and having an amplitude which equals to amplitude of a triangular wave carrier, and supplies each phase voltage command to the correction circuit 32.

To this correction circuit 32, the neutral point voltage command Vn* and the voltage Vbm of the battery 10 are supplied. The neutral point voltage command Vn* has been calculated by the feedback (F/B) section 34 from a difference between the power supply line voltage Vbs of the auxiliary battery 18 and the target voltage value Vbs* thereof. The correction circuit 32 then matches the average value of the each phase voltage command Vu, Vv, Vw to the Vn* based on Vn* and Vbm, and also corrects the output torque Tmg* so that the Vbm corresponds to the target value Vbm*. Thus, corrected voltage commands of each phase Vu', Vv', Vw' are output from the correction circuit 32 and then supplied to a carrier comparison circuit 36.

In the carrier comparison circuit 36, to which a triangular wave which is carrier is supplied, each phase voltage command Vu', Vv', VW' is compared with the carrier and the gate signals Su, Sv, Sw shown in FIG. 15 are output.

According to the present embodiment, the amplitude of the each phase voltage command is controlled within a predetermined value due to calculation in the voltage command operation section 30. Consequently, the gate signals Su, Sv, Sw repeat ON and OFF at the carrier frequencies, so that it is possible to prevent significant change in the neutral point voltage.

Figure 17:
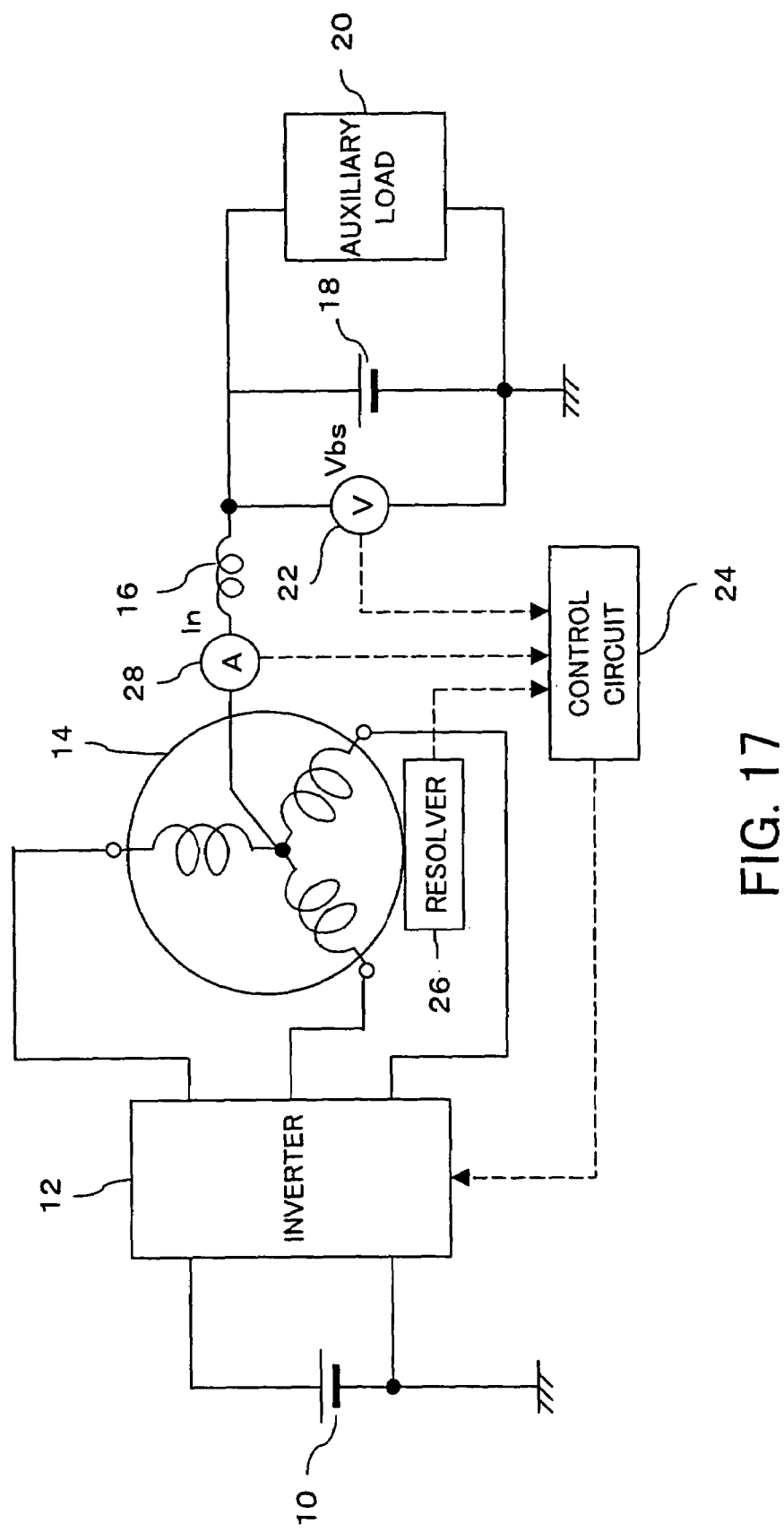
FIG. 17 is a view showing a configuration of a system according to the third embodiment of the present invention.

FIG. 17 shows a system configuration according to still another example, one in which an ammeter 28 is provided for measuring the neutral point current In. The control circuit 24 uses the neutral point current In to apply feed-forward control to the neutral point voltage command at the time of control mode switching.

In this system, the control modes of the motor 14 include a stop mode, a start mode, and a power generation mode. In the control transition state in which the control modes are switched, for example, from the stop mode to the start mode or from the power generation mode to the stop mode, the feedback control which controls the neutral point voltage to the target voltage does not follow, which causes the neutral point voltage to be transitionally shifted from the auxiliary power supply line target voltage and simultaneously changes the neutral point current.

Figure 18:
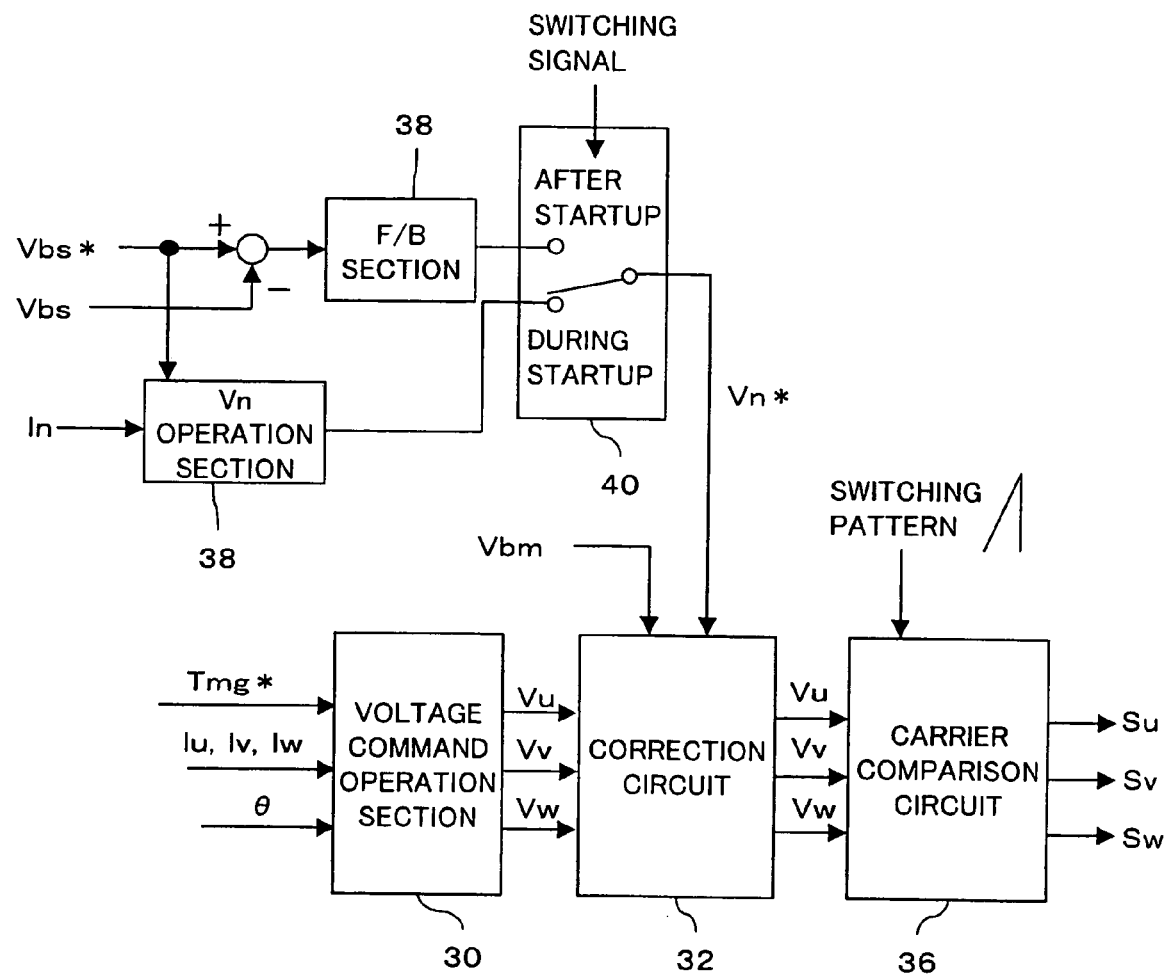
FIG. 18 is a view showing a configuration of a control circuit of the system shown in FIG. 17.
Figure 19:
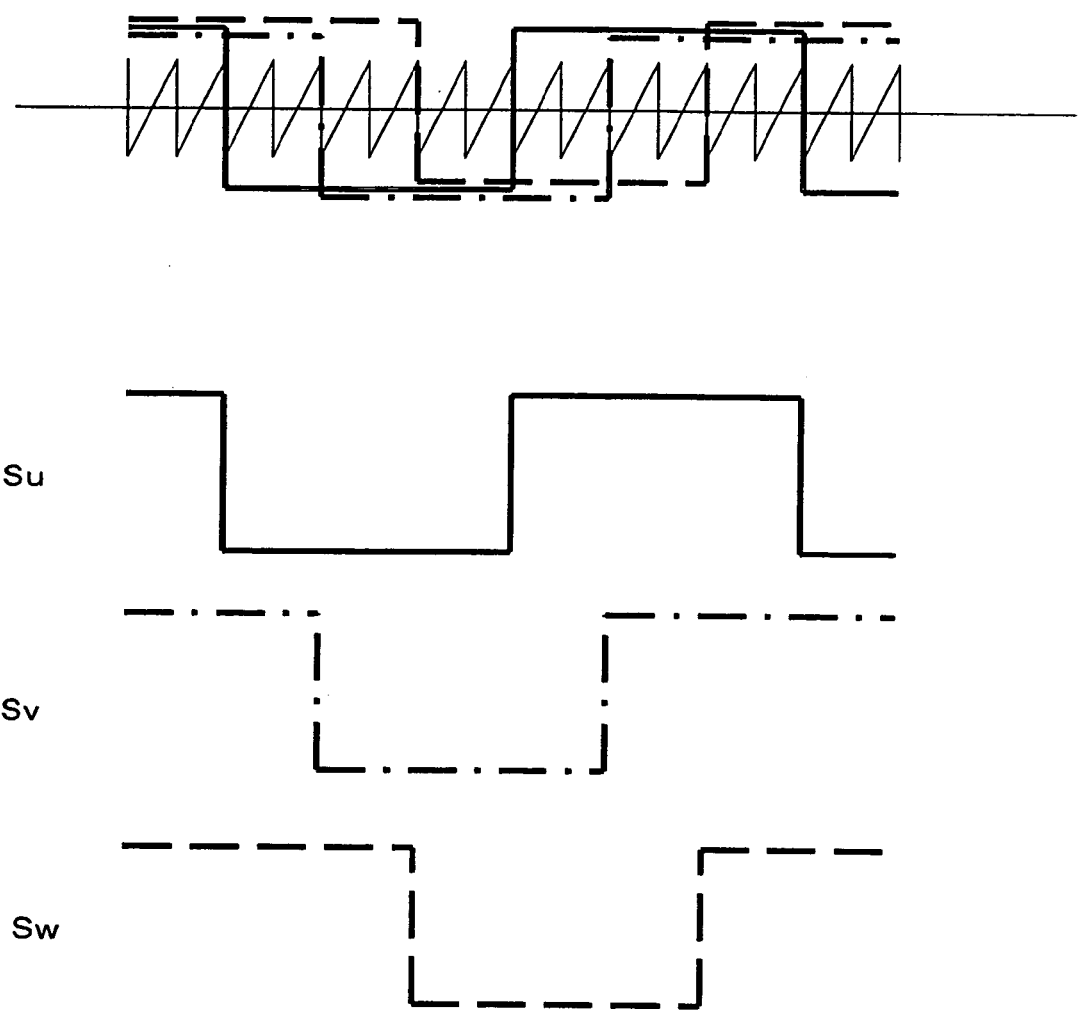
FIG. 19 is a view showing an example operation of convention carrier comparison.

FIG. 18 shows a configuration of the control circuit 24 according to this embodiment. As shown, the configuration according to this embodiment comprises a Vn operation section 38, where the target voltage of the auxiliary power supply line Vbs* and the neutral point current In are supplied and the neutral point voltage command Vn* is calculated by Vn*=Vbs*+R1×In, taking consideration of the voltage drop by the reactor.

Then, both Vn* which is output form the Vn operation section 38 and Vn* which is output from the feedback (F/B) section 34 are input to the switching section 40. The switching section 40 selects the output from the Vn operation section 38 during startup, and selects the output from the feedback (F/B) section 34 after startup, the selected Vn* being supplied to the correction circuit 32.

In this manner, only In is subjected to feedback whereas Vbs* is always a correct target value, so that neutral point voltage control which includes feed-forward element can be performed. It is therefore possible to prevent the neutral point voltage from changing significantly from Vbs*, so that stable control can be performed in the control transition period.

The above control is effective not only when starting the power generation mode switched from the stop mode, but also when shifting from the power generation mode to the stop mode.

Further, this control operation may be preferably combined with a control operation of adjusting each phase output voltage command described above in accordance with the carrier amplitude.

Here, it is preferable that the alternating current motor 14 is one used for a vehicle, and is mounted on a vehicle. The auxiliary load 20 may be any of various auxiliaries mounted on the vehicle. Further the alternating current motor 14 mounted on a vehicle may preferably be a motor generator for Eco Run System which is described in Japanese Patent Laid-Open Publication No. 2002-155773.

More specifically, this motor generator is used, for example, for (i) traveling of a vehicle with the engine automatically actuated in a case in which the vehicle is started after idling stop control is performed for shutting down the engine operation when the vehicle stops; (ii)

regenerative power generation achieved by transmitting the revolution of a wheel via a drive system when the driving speed is reduced; (iii) driving of a compressor used for an air conditioner and a pump used for power steering at the time of engine stop due to stop of a vehicle; (iv) power generation when the engine is being driven; (v) control of the revolution of the engine which is not activated to reduce the vibration generated at the time of engine stop; and (vi) prevention of engine stalling as a result of reduced fuel supply to the engine during deceleration, until the engine is recovered and normal fuel supply resumed.

As described above, according to the present embodiment, by limiting the sinusoidal wave voltage command within a predetermined range with regard to the carrier amplitude, a gate signal having the same frequency as the carrier frequency can be obtained. It is therefore possible to prevent the problem that the switching does not occur for a long period and significant current flows as the neutral point current.

Further, in the mode transition state, a feed-forward element is included in the neutral point voltage command, so that delay of the neutral point voltage control can be prevented, thereby achieving stable control.

What is claimed is:

1. An inverter system for driving a poly-phase motor, the system comprising:
   an alternating current motor which is driven by an inverter for outputting drive force or generating power;
   a power supply connected to a neutral point of the alternating current motor;
   neutral point state detecting means for detecting a state of current or voltage at the neutral point, and
   control means for determining an abnormality caused by disconnection of the power supply from the neutral point,
   wherein the abnormality determination is performed based on the detection result of the neutral point state detecting means.

2. An inverter system according to claim 1, wherein the neutral point state detecting means detects ripples of voltage at the neutral point.

3. An inverter system according to claim 1, wherein an auxiliary electrical device that consumes electrical power is connected to the power supply, and
   the neutral point state detecting means detects ripples of current supplied to the auxiliary electrical device.

4. An inverter system according to claim 2, wherein abnormality is determined when the ripples detected by the neutral point state detecting means are equal to or greater than a predetermined value.

5. An inverter system according to claim 1, wherein a reactor is connected between the neutral point and the power supply, and
   the neutral point state detecting means detects a state of current or voltage on the side of the power supply with respect to the reactor.

6. An inverter system for driving a poly-phase motor according to claim 1, wherein
   the alternating current motor is an alternating current motor used for a vehicle.

7. An abnormality detecting method in an inverter system for driving a poly-phase motor comprising an alternating current motor which is driven by an inverter and generates power, and a power supply connected to a neutral point of the alternating current motor, comprising determining an abnormality resulting from disconnection of the power supply from the neutral point by detecting a state of current or voltage at the neutral point, and performing the abnormality determination based on the detection result.

8. An abnormality detecting program in an inverter system for driving a poly-phase motor comprising an alternating current motor which is driven by an inverter and generates power, a power supply connected to a neutral point of the alternating current motor, and an abnormality detecting apparatus for monitoring current or voltage of the neutral point, comprising:
   the abnormality detecting program causing the abnormality detecting apparatus to capture a state of current or voltage at the neutral point and perform an abnormality determination to detect an abnormality resulting from disconnection of the power supply from the neutral point based on the captured state.

9. An inverter system for driving a poly-phase motor comprising an alternating current motor which is driven by an inverter for outputting drive force and generating power and a power supply connected to an neutral point of the alternating current motor, the power supply being charged by power generated by the alternating current motor and supplying electrical power to a plurality of electrical devices, the inverter system comprising:
   power supply line voltage detecting means for detecting voltage on a power supply line to which the power supply is connected; and
   power supply current detecting means for detecting current of the power supply, wherein
   during normal operation, the inverter is controlled in accordance with an output of the power supply line voltage detecting means, and
   when it is determined that the power supply line voltage detecting means is operating abnormally, the inverter is controlled in accordance with an output of the power supply current detecting means.

10. An inverter system according to claim 9, wherein
    in the event of an abnormality in the power supply line voltage detecting means, control is performed such that the power supply current becomes 0 in accordance with the output of the power supply current detecting means.

11. An inverter system for driving a poly-phase motor claim 9, wherein
    the alternating current motor is an alternating current motor used for a vehicle.

12. An inverter system for driving a poly-phase motor comprising an alternating current motor which is driven by an inverter for outputting drive force and generating power and a power supply connected to a neutral point of the alternating current motor, the power supply being charged by power generated by the alternating current motor and supplying electrical power to a plurality of electrical devices, the inverter system comprising:
    power supply line voltage detecting means for detecting voltage on a power supply line to which the power supply is connected; and
    neutral point current detecting means for detecting neutral point current which is input and output with respect to the neutral point of the alternating current motor, wherein
    during normal operation, the inverter is controlled in accordance with an output of the power supply line voltage detecting means, and
    when the power supply line voltage detecting means is operating abnormally, the inverter is controlled in accordance with an output of the neutral point current detecting means.

13. An inverter system according to claim 12, wherein
the neutral point current detecting means detects current of each of three phases of the alternating current motor, and detects the neutral point current based on the detected values.

14. An inverter system for driving a poly-phase motor comprising an alternating current motor which is driven by an inverter for outputting drive force and generating power and a power supply connected to a neutral point of the alternating current motor, the power supply being charged by power generated by the alternating current motor and supplying electrical power to a plurality of electrical devices, the inverter system comprising:
power supply line voltage detecting means for detecting voltage on a power supply line to which the power supply is connected, and wherein
during normal operation, the inverter is controlled in accordance with an output of the power supply line voltage detecting means, and
when the power supply line voltage detecting means is operating abnormally, the inverter is controlled in accordance with a neutral point voltage command corresponding to a target voltage of the power supply.

15. An inverter system according to claim 14, wherein
the neutral point voltage command is corrected base on at least one of revolution of the alternating current motor, an output torque command, and inverter input side voltage.

16. A control method of an inverter system for driving a poly-phase motor comprising an alternating current motor which is driven by an inverter for outputting drive force and generating power and a power supply connected to a neutral point of the alternating current motor, the power supply being charged by power generated by the alternating current motor and supplying electrical power to a plurality of electrical devices, wherein
during normal operation, the inverter is controlled in accordance with voltage of a power supply line to which the power supply is connected, and
in the event of abnormality in sensing of the power supply line voltage, the inverter is controlled in accordance with current of the power supply.

17. A control method of an inverter system for driving a poly-phase motor comprising an alternating current motor which is driven by an inverter for outputting drive force and generating power and a power supply connected to a neutral point of the alternating current motor, the power supply being charged by power generated by the alternating current motor and supplying electrical power to a plurality of electrical devices, wherein
during normal operation, the inverter is controlled in accordance with voltage of a power supply line to which the power supply is connected, and
in the event of abnormality in sensing of the power supply line voltage, the inverter is controlled in accordance with current of the neutral point.

18. A control method of an inverter system for driving a poly-phase motor comprising an alternating current motor which is driven by an inverter for outputting drive force and generating power and a power supply connected to a neutral point of the alternating current motor, the power supply being charged by power generated by the alternating current motor and supplying electrical power to a plurality of electrical devices, wherein
during normal operation, the inverter is controlled in accordance with voltage of the power supply line, and
in the event of abnormality in sensing of the power supply line voltage, the inverter is controlled in accordance with a neutral point voltage command corresponding to a target voltage of the power supply.

19. A machine-readable medium having stored thereon a plurality of executable instructions to perform a method of controlling an inverter system for driving a poly-phase motor including an alternating current motor which is driven by an inverter for outputting drive force and generating power and a power supply connected to a neutral point of the alternating current motor, the power supply being charged by power generated by the alternating current motor and supplying electrical power to a plurality of electrical devices, wherein said method comprising:
during normal operation, the inverter is controlled in accordance with voltage of the power supply line, and
in the event of abnormality in sensing of the power supply line voltage, the inverter is controlled in accordance with a neutral point voltage command corresponding to a target voltage of the power supply.

20. An inverter system for driving a poly-phase motor, comprising a high voltage power supply, an inverter with the high voltage power supply being connected to an input side and with an alternating current motor being connected to an output side, and a low voltage power supply connected to a neutral point of the alternating current motor, the inverter system controlling driving of the alternating current motor and transfer of electrical power between the high voltage power supply and the low voltage power supply by controlling driving of the inverter, wherein
switching of the inverter is performed by controlling the switching on and off of a switching element of the inverter based on a gate signal obtained from comparison between a voltage command which is sinusoidal wave and carrier, and
the voltage command which is sinusoidal wave is limited within a predetermined range with regard to the carrier amplitude.

21. An inverter system for driving a poly-phase motor according to claim 20, wherein
the alternating current motor is an alternating current motor for a vehicle.

22. An inverter system for driving a poly-phase motor comprising a high voltage power supply, an inverter with the high voltage power supply being connected to an input side and with an alternating current motor being connected to an output side, and a low voltage power supply connected to a neutral point of the alternating current motor, the inverter system controlling driving of the alternating current motor and transfer of electrical power between the high voltage power supply and the low voltage power supply by controlling driving of the inverter, wherein
driving control of the alternating current motor includes at least a stop mode and a power generation mode, and
a feed-forward element is included in a neutral point voltage command in a transition state of these modes.

23. A control method of an inverter system for driving a poly-phase motor comprising a high voltage power supply, an inverter having the high voltage power supply connected to an input side and having an alternating current motor connected to an output side, and a low voltage power supply connected to a neutral point of the alternating current motor, in which driving of the alternating current motor and transfer of electrical power between the high voltage power supply and the low voltage power supply is controlled by controlling driving of the inverter, wherein switching of the inverter is performed by controlling on and off of switching element of the inverter based on a gate signal obtained from comparison between a voltage command which is sinusoidal wave and carrier, and the voltage command which is sinusoidal wave is limited within a predetermined range with regard to the carrier amplitude.

24. A control method of an inverter system for driving a poly-phase motor comprising a high voltage power supply, an inverter with the high voltage power supply being connected to an input side and with an alternating current motor being connected to an output side, and a low voltage power supply connected to a neutral point of the alternating current motor, in which driving of the alternating current motor and transfer of electrical power between the high voltage power supply and the low voltage power supply is controlled by controlling driving of the inverter, wherein driving control of the alternating current motor includes at least a stop mode and a power generation mode, and a feed-forward element is included in a neutral point voltage command in a transition state of these modes.

* * * * *

UNITED STATES PATENT AND TRADEMARK OFFICE
CERTIFICATE OF CORRECTION

| | |
|---|---|
| PATENT NO. | : 7,098,624 B2 |
| APPLICATION NO. | : 10/519791 |
| DATED | : August 29, 2006 |
| INVENTOR(S) | : Yasushi Kusaka |

It is certified that error appears in the above-identified patent and that said Letters Patent is hereby corrected as shown below:

Column    Line

14    42    Change "claim 9" to --claim 20--.

Signed and Sealed this

Seventeenth Day of July, 2007

JON W. DUDAS
*Director of the United States Patent and Trademark Office*